(12) United States Patent
Kottomtharayil

(10) Patent No.: US 7,987,319 B2
(45) Date of Patent: *Jul. 26, 2011

(54) SYSTEM AND METHOD FOR IMPROVED MEDIA IDENTIFICATION IN A STORAGE DEVICE

(75) Inventor: Rajiv Kottomtharayil, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/795,870

(22) Filed: Jun. 8, 2010

(65) Prior Publication Data

US 2010/0312987 A1    Dec. 9, 2010

Related U.S. Application Data

(63) Continuation of application No. 12/372,081, filed on Feb. 17, 2009, now Pat. No. 7,739,450, which is a continuation of application No. 11/313,267, filed on Dec. 19, 2005, now Pat. No. 7,603,518.

(51) Int. Cl.
*G06F 13/00* (2006.01)
*G06F 17/30* (2006.01)
*G06K 9/18* (2006.01)

(52) U.S. Cl. ............... 711/115; 707/749; 707/E17.014; 382/103

(58) Field of Classification Search .................. None
See application file for complete search history.

(56) References Cited

U.S. PATENT DOCUMENTS

| | | |
|---|---|---|
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |

(Continued)

FOREIGN PATENT DOCUMENTS

EP    0259912 A1    3/1988

(Continued)

OTHER PUBLICATIONS

Armstead et al., "Implementation of a Campus-wide Distributed Mass Storage Service: The Dream vs. Reality," IEEE, 1995, pp. 190-199.

(Continued)

*Primary Examiner* — Reginald G Bragdon
*Assistant Examiner* — Eric S Cardwell
(74) *Attorney, Agent, or Firm* — Perkins Coie LLP

(57) ABSTRACT

Systems and methods are provided for improved identification of removable storage media. A scanner may be used to read an identifier, such as a barcode, on a removable storage media. In the event that the scanner reads the identifier incorrectly due to a defect in the barcode, such as a damaged label, misaligned identifier, or because the scanner is incapable of reading the identifier type or the scanner's field of view is incorrect, a media management component receives the scanned identifier data and matches it to a known set of media identifiers to create a subset of matching identifier data. A closest matching media identifier may be identified from the subset of matching identifier data. An index may be updated with information indicating the closest matching media identifier and a location of the removable storage media.

19 Claims, 8 Drawing Sheets

U.S. PATENT DOCUMENTS

| | | |
|---|---|---|
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,398 A * | 2/2000 | Brown et al. ............... 707/745 |
| 6,026,414 A | 2/2000 | Anglin |
| 6,052,735 A | 4/2000 | Ulrich et al. |
| 6,076,148 A | 6/2000 | Kedem |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,658,526 B2 | 12/2003 | Nguyen et al. |
| 7,035,880 B1 | 4/2006 | Crescenti et al. |
| 7,107,298 B2 | 9/2006 | Prahlad et al. |
| 7,162,496 B2 | 1/2007 | Amarendran et al. |
| 7,603,518 B2 | 10/2009 | Kottomtharayil |
| 7,739,450 B2 | 6/2010 | Kottomtharayil |
| 2005/0033913 A1 | 2/2005 | Kottomtharayil et al. |
| 2006/0169769 A1* | 8/2006 | Boyarsky et al. ............. 235/381 |

FOREIGN PATENT DOCUMENTS

| | | |
|---|---|---|
| EP | 0405926 A2 | 1/1991 |
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0981090 A1 | 2/2000 |
| WO | WO-9513580 A1 | 5/1995 |
| WO | WO-9912098 A1 | 3/1999 |

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco,CA.

Eitel, "Backup and Storage Management in Distributed Heterogeneous Environments," IEEE, 1994, pp, 124-126.

Jander, M., "Launching Storage-Area Net," Data Communications, US, McGraw Hill, NY, vol. 27, No. 4 (Mar. 21, 1998), pp. 64-72.

Jason Gait, "The Optical File Cabinet: A Random-Access File System For Write-Once Optical Disks," IEEE Computer, vol. 21, No. 6, pp. 11-22 (1988) (see in particular figure 5 in p. 15 and recitation in claim 5).

Rosenblum et al., "The Design and Implementation of a Log-Structured File System," Operating Systems Review SIGOPS, vol. 25, No. 5, New York, US, pp. 1-15 (May 1991).

* cited by examiner ated Feb. 17, 2009, now U.S. Pat. No. 7,739,
SYSTEM AND METHOD FOR IMPROVED MEDIA IDENTIFICATION IN A STORAGE DEVICE

CROSS-REFERENCE TO RELATED APPLICATION(S)

This application is a continuation of U.S. patent application Ser. No. 12/372,081, titled SYSTEM AND METHOD FOR IMPROVED MEDIA IDENTIFICATION IN A STORAGE DEVICE, filed Feb. 17, 2009, now U.S. Pat. No. 7,739,450, which is a continuation of U.S. patent application Ser. No. 11/313,267, titled SYSTEM AND METHOD FOR IMPROVED MEDIA IDENTIFICATION IN A STORAGE DEVICE, filed Dec. 19, 2005, now U.S. Pat. No. 7,603,518, both of which are hereby incorporated herein by reference in their entireties. This application is related to the following pending applications, each of which is hereby incorporated herein by reference in its entirety:

application Ser. No. 10/819,102, titled SYSTEM FOR CONTROLLING A ROBOTIC ARM IN A STORAGE DEVICE, filed Apr. 5, 2004, abandoned;

application Ser. No. 10/663,383, titled SYSTEM AND METHOD FOR BLIND MEDIA SUPPORT, filed Sep. 16, 2003, now U.S. Pat. No. 7,162,496;

application Ser. No. 10/260,209, titled SYSTEM AND METHOD FOR ARCHIVING OBJECTS IN AN INFORMATION STORE, filed Sep. 30, 2002, now U.S. Pat. No. 7,107,298; and application Ser. No. 09/610,738, titled MODULAR BACKUP AND RETRIEVAL SYSTEM USED IN CONJUNCTION WITH A STORAGE AREA NETWORK, filed Jul. 6, 2000, now U.S. Pat. No. 7,035,880.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND

The invention disclosed herein relates generally to improved identification of media identifiers.

Removable media storage devices such as tape libraries, optical libraries, and CD-ROM jukeboxes are frequently used for storage of electronic data generated by client computers. A removable media storage device generally includes removable media such as tape cartridges, optical disks, or CD-ROMS and may also include a mechanism, such as a robotic arm, that moves the removable media into and out of a drive where content of the media may be read or updated.

Removable media may include an identifier which may be affixed to the media, such as a hand printed label, machine-readable barcode, or other identifier. The media identifier generally contains information naming, indicating, distinguishing or otherwise identifying the media. The use of barcodes to identify removable media allows storage devices to operate autonomously with greater efficiency. For example, a removable media storage device equipped with a barcode reader may identify and select a removable media for a storage operation based on the respective barcode. A storage device with a barcode reader may automatically identify a specific item of removable media according to the barcode thereon and insert the removable media in a corresponding drive to perform a storage operation. Thus, a storage operation can proceed according to predefined schedules and criteria with minimal operator intervention resulting in greater efficiency.

There are several types of barcodes. In general, a typical barcode includes a series of vertical lines or other graphical indicators which correspond to a code comprising alphanumeric characters. Barcodes can be read by optical scanners which scan the vertical lines forming a barcode. Barcodes applied to media are generally a standard length, such as six or eight characters, which may be in accordance with ANSI/AIM standards.

Some optical scanners that read barcodes may be capable of reading only one type of barcode, or only barcodes of a particular length. When a new media item, such as a tape cartridge, optical disk, or CD-ROM is added to a storage device that has such an optical scanner, the media identifier information may not be readable by the scanner. This may occur when using new barcoded media items in a legacy storage device. For example, an older scanner in the legacy storage device may not be equipped to process new barcodes. To avoid such problems, a storage management systems may be limited to using certain barcoded media, or alternatively, the optical scanner may be replaced or upgraded.

In addition to scanner limitations, there may be problems with labels or fields of view for scanners that cause a scanner to read a media identifier incorrectly. For example, a media identifier may lie outside of a field of scan, and portions of the identifier may not be scanned, or a media identifier may be damaged, misaligned or otherwise unreadable. For example, a label including a media identifier may be worn or placed in a position that may prevent the optical scanner from reading the media identifier in its entirety. Thus only a portion of the identifier is read and the media cannot be identified.

SUMMARY

The present invention relates to providing improved identification of identifiers, such as a barcode, for removable media. In one embodiment, a method for automatically identifying a removable media identifier is provided in which data is received which indicates an identifier of a removable medium. The received identifier may be a barcode, radio frequency identification tag or other identifier. The received identifier is compared with a set including a plurality of known media identifiers to identify a subset of known media identifiers among the set including the plurality of known media identifiers which match the received identifier. The subset of known media identifiers may be identified by matching a predefined number of characters of the received identifier and the set including the plurality of known media identifiers, or alternatively by matching a pattern of characters of the received identifier and the set including the plurality of known media identifiers. The number of media identifiers included in the subset is determined to satisfy a threshold; and from the subset, a closest match to the received identifier is identified. The threshold may be user-defined or preset, for example, in accordance with a storage policy or template or other setting. An index entry for the closest match identifier may be updated indicating a location of the removable medium.

In another embodiment, a method for maintaining an index of removable media items is provided in which data is received, the data indicating an identifier for a removable medium and indicating a location of the removable medium.

The identifier is matched to a set of known media identifiers to generate a subset of media identifiers. A closest match of the subset of media identifiers is determined and an index entry for the closest matching identifier is updated with the location of the removable medium. The location of the removable medium may be verified, in accordance with a storage policy, by scanning a media identifier on the removable medium in a storage device; obtaining a current location of the removable medium; and updating the index entry with the current location of the removable medium.

DETAILED DESCRIPTION

Figure 1:
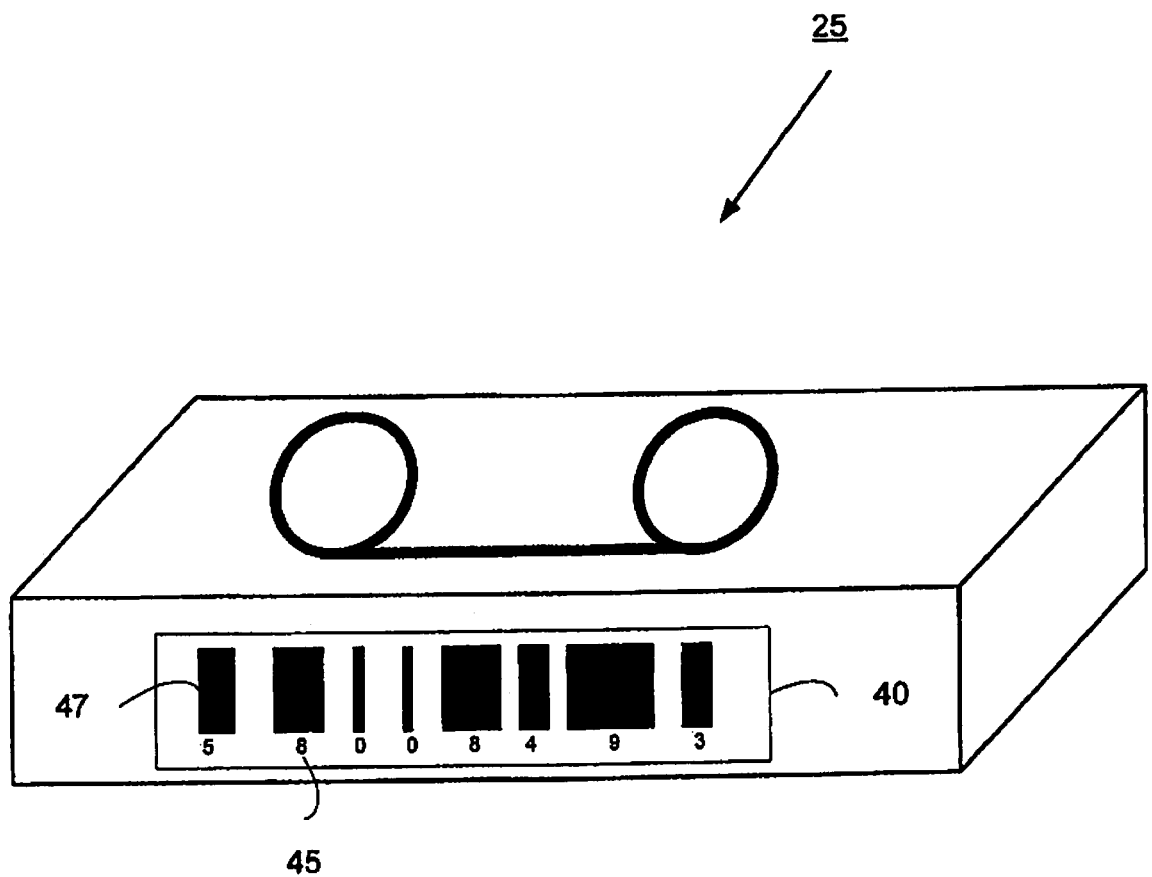
FIG. 1 is a block diagram showing a view of a media identifier on removable media according to an embodiment of the invention.

The present invention relates to systems and methods for improving identification of removable media items in a storage device. Removable media items may include optical media, disks, tapes, magnetic media, or other removable media. One example of removable media is the tape 25 depicted in FIG. 1. In general media may be removable if it can be detached and removed from a storage device in which the media is used to perform reading or writing operations or other storage operations. Removable media is frequently used in storage management systems and is useful for storing data or for performing other storage operations. Storage operations, as used herein, may include creating, storing, retrieving, and migrating primary storage data and secondary storage data (which may include, for example, snapshot copies, backup copies, HSM copies, archive copies, and other types of copies of electronic data) stored on storage devices.

As shown, removable media 25 may include an identifier 40, such as a barcode, which may comprise a series of vertical lines 47 or other indicators which may correspond to an alphanumeric code 45. Media identifier 40 may also comprise characters, a combination of numbers and characters, symbols, or other forms of identifiers and can be printed on a label or otherwise affixed to various media 25 surfaces. The alphanumeric code 45 or the identifier 40 may be used as an identifier for the media item 25 and used as a basis to track the media item 25, e.g., as a variable in an index, etc. Other forms of machine readable identifiers may also be used on media 25, such as radio frequency identification (RFID) tags, or other item identifiers known in the art.

Figure 2:
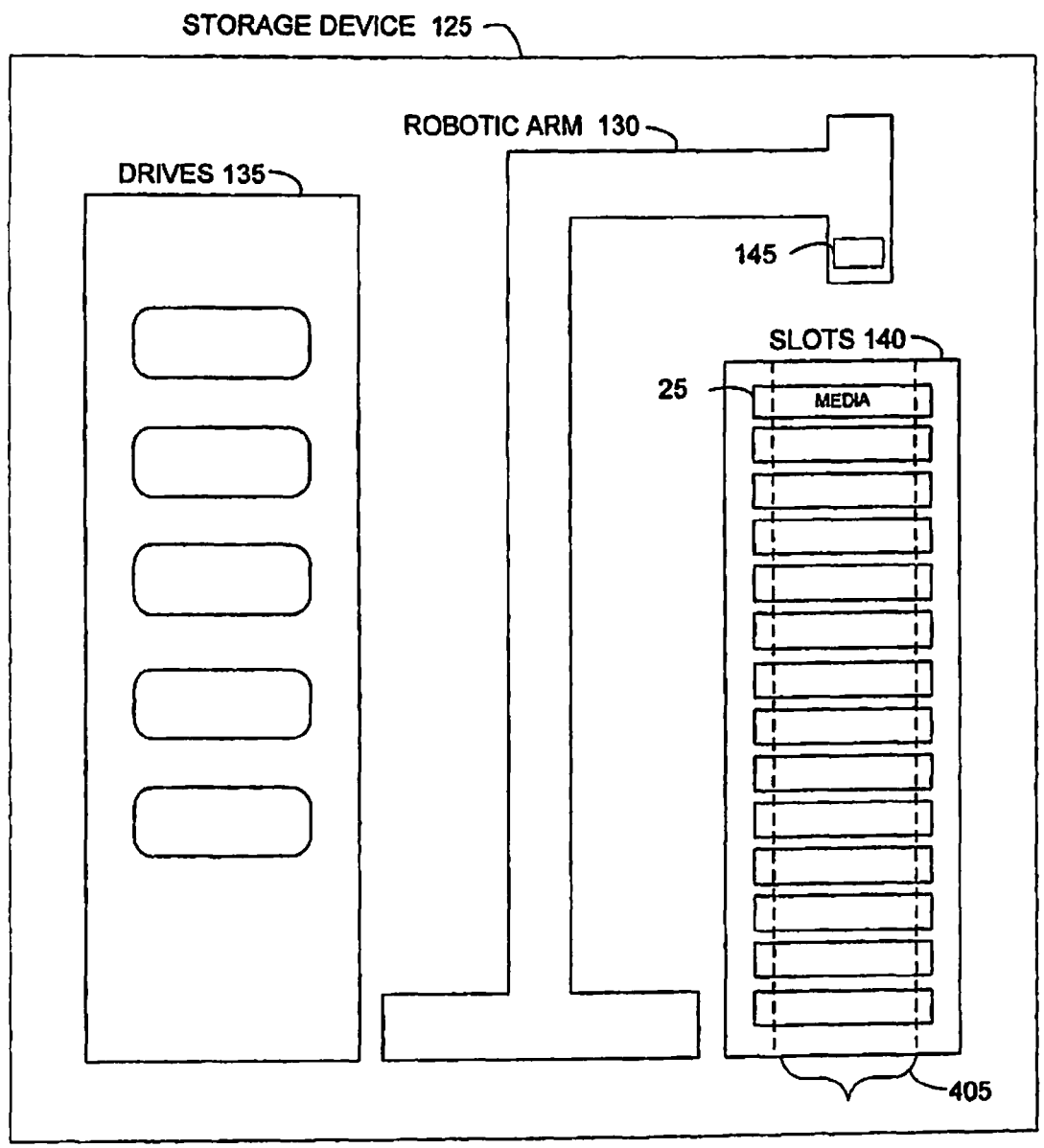
FIG. 2 is a block diagram showing storage device components according to an embodiment of the invention.

Existing storage devices which use removable media may include one or more removable media items 25. For example, as shown in FIG. 2, a storage device 125 may include a plurality of media items 25, which may be loaded to or ejected from slots 140 or drives 135 by a robotic arm 130. The robotic arm 130 may include a scanner 145, such as an optical scanner, RFID scanner, or other scanning device. Each of the elements of the storage device 125 may be any appropriate device known in the art capable of performing a storage operation, for example, the media 25 can be tapes, media cartridges, or other media capable of storing data, such as Linear Tape Open (LTO) or Digital Linear Tape (DLT) tape cartridges. The drives 135 can be disk drives or other drives, such as HITACHI tape drives, which are capable of receiving media 25 and reading and writing stored data on media 25.

The robotic arm 130 is generally capable of obtaining the media 25 from a slot 140 and loading it into a drive 135 and correspondingly capable of removing the media 25 from the drive 135 and replacing the media 25 in a slot 140 in the storage device 125. A slot 140 may be a receptacle or space which may be occupied by a media item 25. In general, the slot 140 does not have the reading or writing capability of a drive, and may be simply a place to temporarily store or hold a media item 25. Each slot 140 has an assigned location or name, which may be used, together with a media identifier to track a location of a media item 25, for example, in an index.

In general, a field of scan of a scanner 145 may be a physical range of space in which a scanner is capable of operating and receiving input, such as a range of space in which the scanner can scanning barcodes, etc. For example, the field of scan may be one or more rows or columns of slots in a storage device, or may be a range of one or more tapes and identifiers thereon. In some instances, a field of scan may not cover all or portions of an identifier on a tape or media item, for example when a media identifier is relatively long. In other instances, the field of scan may omit sections of rows or columns of media slots. For example, one field of scan 405 may capture only a middle portion of media 25. Such field of scan 405 may fail to capture media identifier information which may lie outside of the field of scan, thus obtaining only a portion of media identifier information. Capturing incomplete media identifier data may cause identification of the media item 25 to fail because the incomplete identifier data cannot be matched with a media identifier in a database of identifiers. In this case, a storage management system may determine that the media item 25 is new because it cannot otherwise identify the media item 25 as a recognized media item 25. This may be problematic because a storage management system may lose data by deleting, overwriting, or formatting the unrecognized media item 25.

Figure 3:
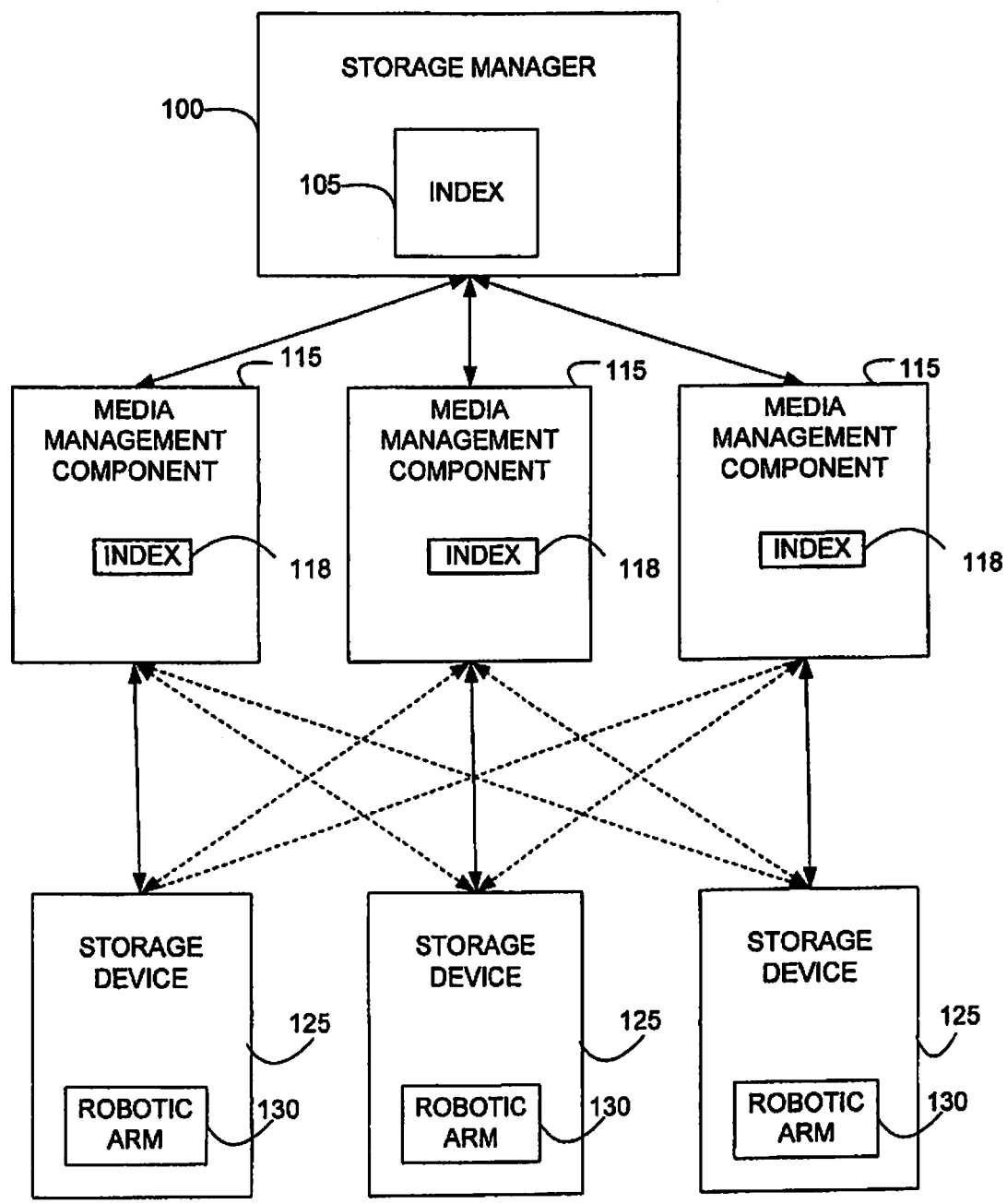
FIG. 3 is a block diagram of a network architecture in accordance with one embodiment of the invention.

One storage management system used to perform the invention described herein may be the storage management system depicted in FIG. 3, but other storage management system architectures may also be used. As shown, a storage management system may include a storage manager 100, which includes an index 105, media management devices 115, which include a media management device index 118, and storage devices 125, which include a robotic arm 130. The storage manager 100 can be a software module, which is capable of coordinating and controlling a storage system. For example, the storage manager 100 communicates with all components of the storage system, including, for example, a media management device 115, to initiate, perform, and manage system backups, migrations, restores, and other storage-related operations.

The index 105 included in the storage manager 100 can be any index that is maintained to store index data for each system storage operation, such as, the data the system generates during storage operations such as backup, migration, configuration, restore, and other storage operations as further described herein. The index 105 can also be a storage index known in the art, such as, for example, the index cache of CommVault's Galaxy™ as further described in application Ser. No. 10/260,209 which is incorporated herein by reference in its entirety. The index 105 stores data related to logical association controls, network pathways, and maintaining hierarchies in system components. For example, the index 105 may store data such as the relationships between a storage manager and components of the storage system and the relationships between the components of the storage system. In addition, the index 105 may store data defining communication pathways between the storage system components. Index data is useful because, among other benefits, it provides the system with an efficient mechanism for locating information associated with performing storage operations.

Each media management device 115 is associated with one or more storage devices 125 and controls storage operations of the associated storage device 125. Each media management device 115 may also include an index 118. The media management device index 118 may be used to store data relating to media items, including, for example, data relating to the media identifier, a location of a media item, information relating to the data stored on the media, or other information relating to a media item and data stored thereon.

The media management device 115 is communicatively coupled to a storage manager 100 and a storage device 125. The media management device 115 is capable of communicating instructions from the storage manager 100 to a storage device 125 to undertake a storage operation. For example, the media management device 115 may instruct the storage device 125 to archive, migrate, or restore stored data, perform a library configuration, or other storage operation. The media management devices 115 may also conduct other data between the storage manager 100 and one or more storage devices 125. The media management device 115 generally communicates with the storage device 125 via a local bus such as a SCSI adapter. In some embodiments, the storage device 125 is communicatively coupled to the media management device 115 via a network such as a Storage Area Network ("SAN"), or a Local Area Network ("LAN").

Figure 4:
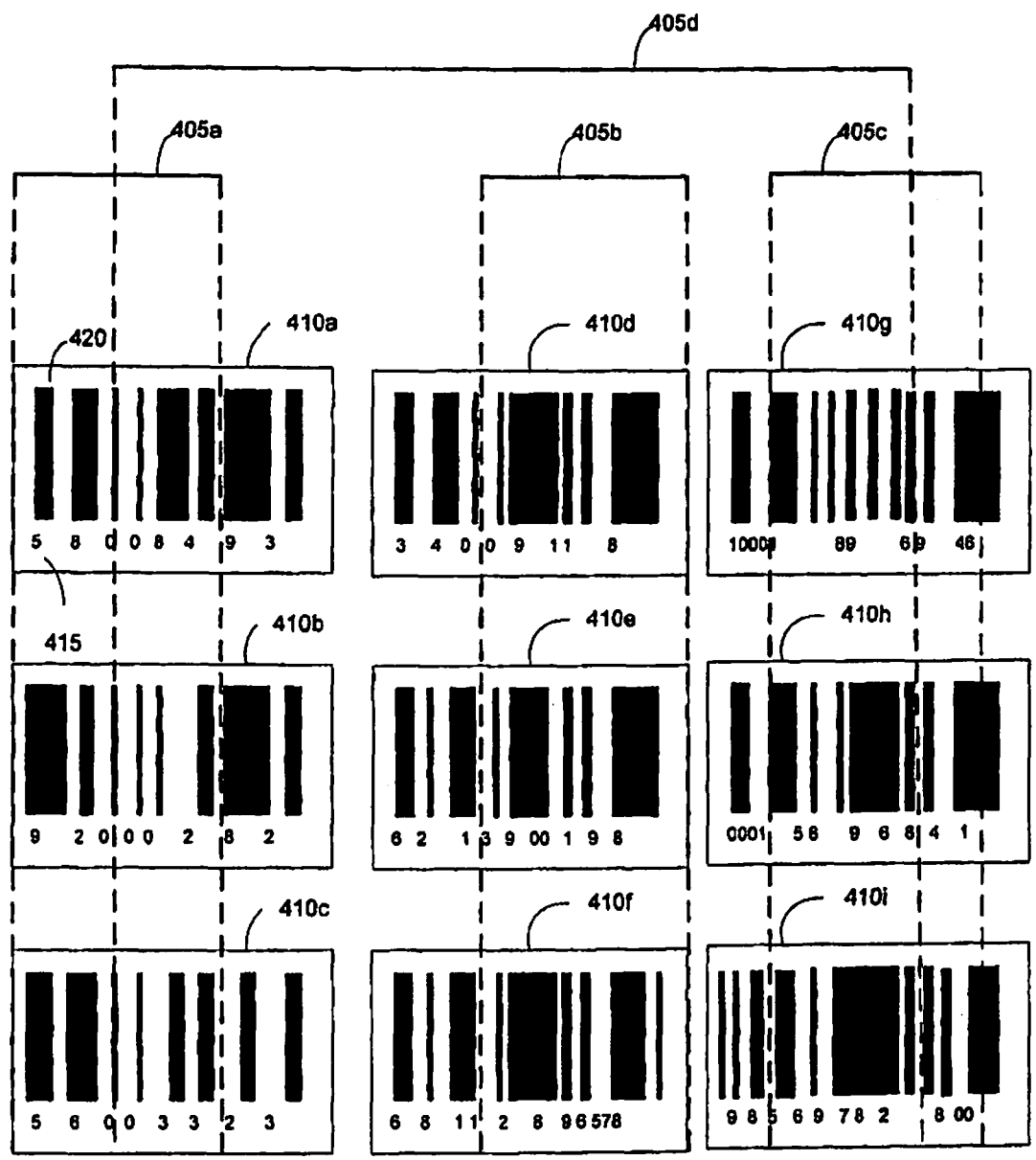
FIG. 4 is a block diagram depicting views of fields of scan of an optical scanner according to an embodiment of the invention.

The barcodes 410 depicted in FIG. 4 comprise several vertical lines 320, each generally corresponding to an alpha-numerical value or other identifier identified at the bottom of each vertical line 415. As shown, the barcodes 410 on media 25 are arranged in a storage device in three columns and three rows of slots. Any number of rows and columns of slots may be included in a storage device depending on a storage device type, storage requirements, etc., as may be appreciated by those skilled in the art. An optical scanner 145 reading the barcodes 410 may scan the series of vertical lines and translate the image data into a corresponding alphanumeric code. Barcodes 410 or other identifier may be assigned or associated with information about media 25, such as a media identifier, type of media, size of the media, media capacity, manufacturer, or information relating to the data contained on the media, such as data type, etc. Such information may be included in an index, such as a media management component index, storage manager index or index of a system component.

The barcode 410 or identifier may be used in connection with storage operations to identify a media item. For example, a media management component may instruct a robotic arm to obtain a particular media item from a particular location, and the robotic arm may use its scanner to scan the media item to confirm its identity. Alternatively, the barcode 410 or media identifier may be used to scan all media items contained in a library or storage device, and provide information about media included therein. A scanner on the robotic arm may scan barcodes on media items to identify or confirm the identity of a media item. As mentioned herein, some optical scanners may be incapable of reading certain types of barcodes. Other optical scanners may encounter problems with a field of scan. For example, a scanner may omit a tail end of a barcode, as shown in field of scan 405a, a front end of a barcode, such as the field of scan 405b, both the front end and tail end of a barcode, as shown in field of scan 405c, or the front and tail ends of barcodes on different rows of media items as shown in field of scan 405d. Other scanning problems may occur if a barcode or other identifier label is damaged, torn, smeared, or otherwise unreadable.

Figure 5:
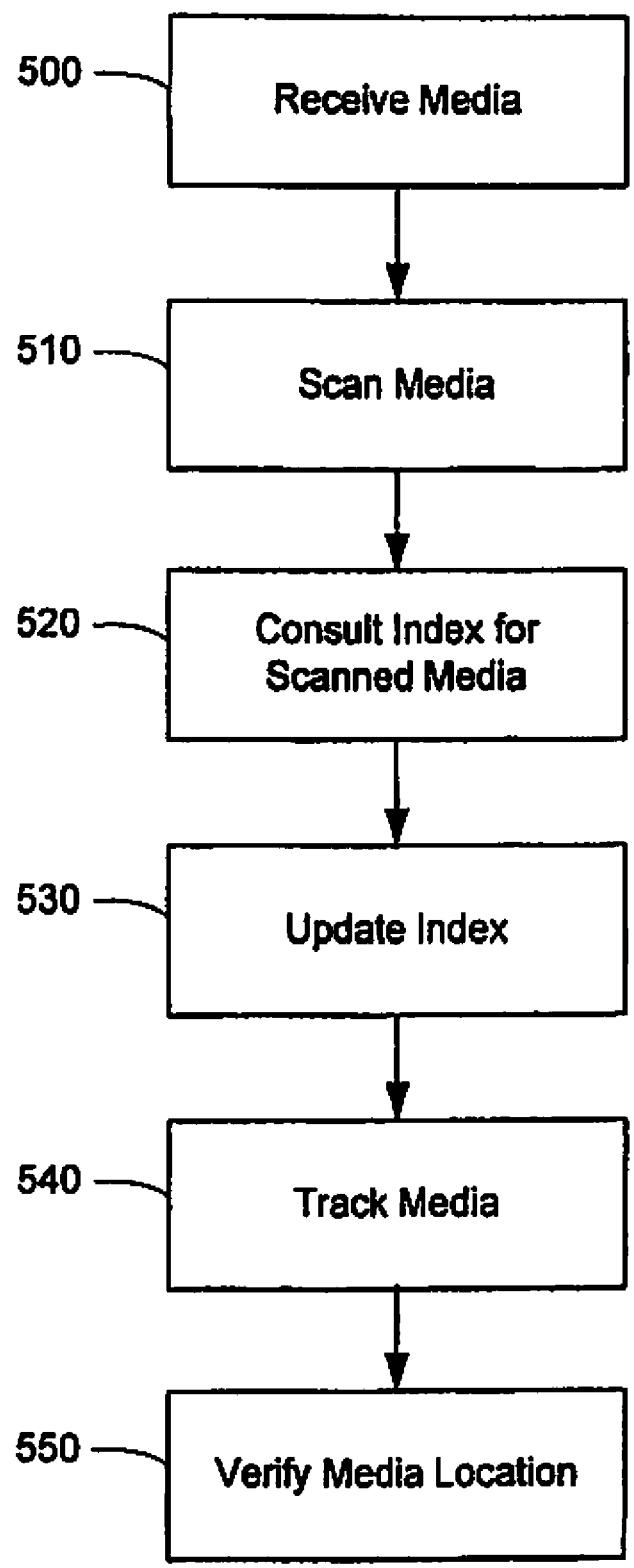
FIG. 5 is a flowchart depicting a method for tracking media according to one embodiment of the invention.

Media may be scanned and tracked according to the flow diagram depicted in FIG. 5. Media items may be received in a storage device, step 500, for example, when new or known media items are added to a storage device. For example, data contained on known media that has been identified for a restore or verification operation may be received in a storage device. The media items are scanned, step 510. The media items may be scanned using a scanner, such as an optical scanner, RFID scanner or other scanning device. The scanner's field of view may cover all or a part of the length of the barcode or media identifier. The scanned media identifier information is communicated from the optical scanner to a media management component or other system component such as a storage manager, and index data is consulted to determine whether the scanned media identifier is included in the index, step 520. For example, if a media item is known to the media management component, storage manager or other system component, its identifier information may be stored in an index. In the event that the media item is new to the system, or in the event that the media identifier may not be recognized, e.g., it is damaged, or the scanning was defective, the new media identifier may be added to the index. Alternatively, the correct identifier for the unrecognized media identifier may be obtained as further described herein.

Information relating to the scanned media may be updated in the index, step 530. For example, information relating to the barcode or media identifier, and location information may be stored to the index, including a slot location in a storage device, a storage device, or other location information. Other information relating to the media may also be included in the index, such as media type, information relating to the data on the media, a storage policy for the media, media capacity, age of the data on the media, age of the media, or other data.

The media may be tracked 540, by maintaining the index with location information and other information relating to the media. For example, location information may be updated when media moves from one location to another location, is between slots in a storage device, moves from one storage device to another storage device, moves from one slot to another slot, etc. Media location information may be verified, step 550, for example, on an ongoing basis according to a storage policy by initiating a configuration operation or other storage operation, in which a scanner in a storage device scans some or all media items in the storage device and compares scanned identifier information and slot or other location information with media identifier and location information in an index.

In some instances, scanned media items may not be recognized by a media management component or other system component because of a problem in scanning the media identifier. For example, as shown in FIG. 4, fields of view of a scanner may omit portions of a barcode or media identifier, or a scanner may be incapable of reading a particular type of barcode, or experience some other problem in scanning the media identifier. Alternatively, there may be a defect in a barcode, such as a damaged label, smudged barcode, or other defect that causes a scanner to read the barcode incorrectly. In this case, an accurate or true identifier for the scanned media identifier may be identified, as further described herein.

Figure 6:
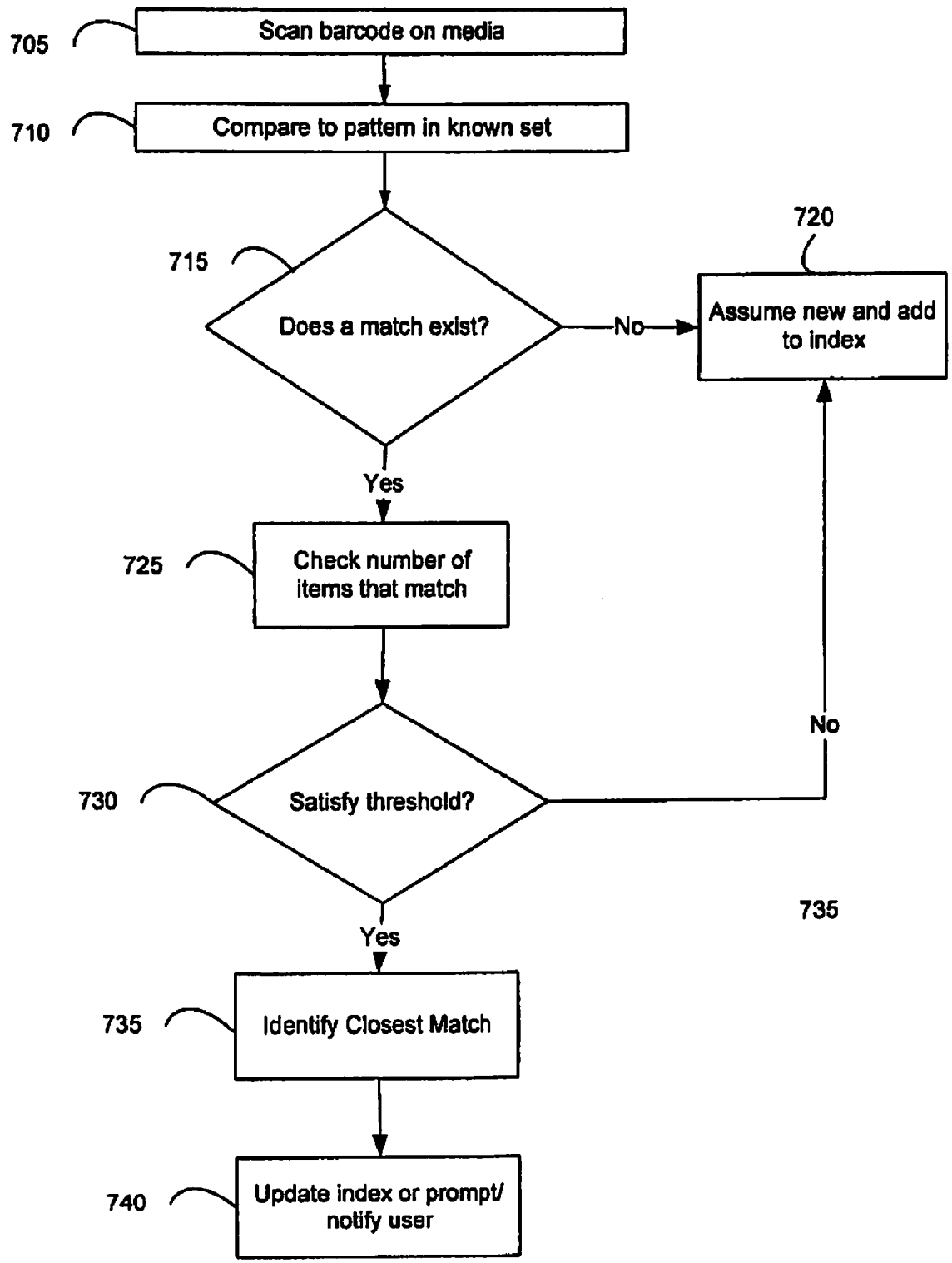
FIG. 6 is a flowchart depicting a method for identifying media according to one embodiment of the invention.

An incorrectly scanned barcode, or a defective barcode may be identified according to the flow diagram of FIG. 6. As shown, a barcode or other media identifier on media may be scanned, step 705. The media may be scanned by a scanner, such as an optical scanner, RFID scanner or other scanner. Scanned media identifier data may be compared to a set of known media identifier data, step 710. In general, the set of known media identifier data may be data stored in an index, such as a media management component index or storage manager index, or media identifier data otherwise provided to a system component. A media management component, storage manager or other system component may perform the comparison of the scanned media identifier data and the known set of media identifier data to determine whether a match exists, step 715. A match need not be an exact match of identifier data values, and may include a degree of correspondence among elements of the identifiers, such as a threshold range of identifier data values. If there is no match between the scanned media identifier data and known media identifier data, the media management component or storage manager assumes that the scanned media item is new, and adds the new media identifier to its index, step 720. The match threshold may be user defined or pre-set and may range from a single alphanumeric character match to a match of multiple alphanumeric characters.

The match for a comparison may include pattern matching, order matching, length matching, character type matching match, sum matching or other matching. One example of a match may be that a pattern of three characters appearing in a six character media identifier scanned in the storage device must appear in the eight character index media identifier data set. Alternatively, the match may require that four characters appearing in consecutive order in a six character media identifier must appear in the same consecutive order in an eight character media identifier. Yet another match may be that the length of a scanned media identifier must be the same as the length of the media identifier data stored in the media management device index or storage manager index. A further match may be that alphanumeric characters appearing in certain positions of a scanned media identifier must correspond to alphanumeric characters appearing in the same positions of a media identifier stored in the storage manager index or media management device index. If a scanned media identifier corresponds to the code "A142B", in order for a match to exist, a second media identifier must contain a letter in the first position, a numerical value in the second, third and fourth positions, followed by a letter in the fifth position. Moreover, the match may require the sum of alphanumeric characters comprising a scanned media identifier to equal the sum of the alphanumeric characters comprising an index media identifier. If the scanned media identifier or index media identifier are comprised of both numerical and non-numerical values, a conversion to numerical values using ASCII values or other conversion methods known to those with ordinary skill in the art may be used.

Figure 7:
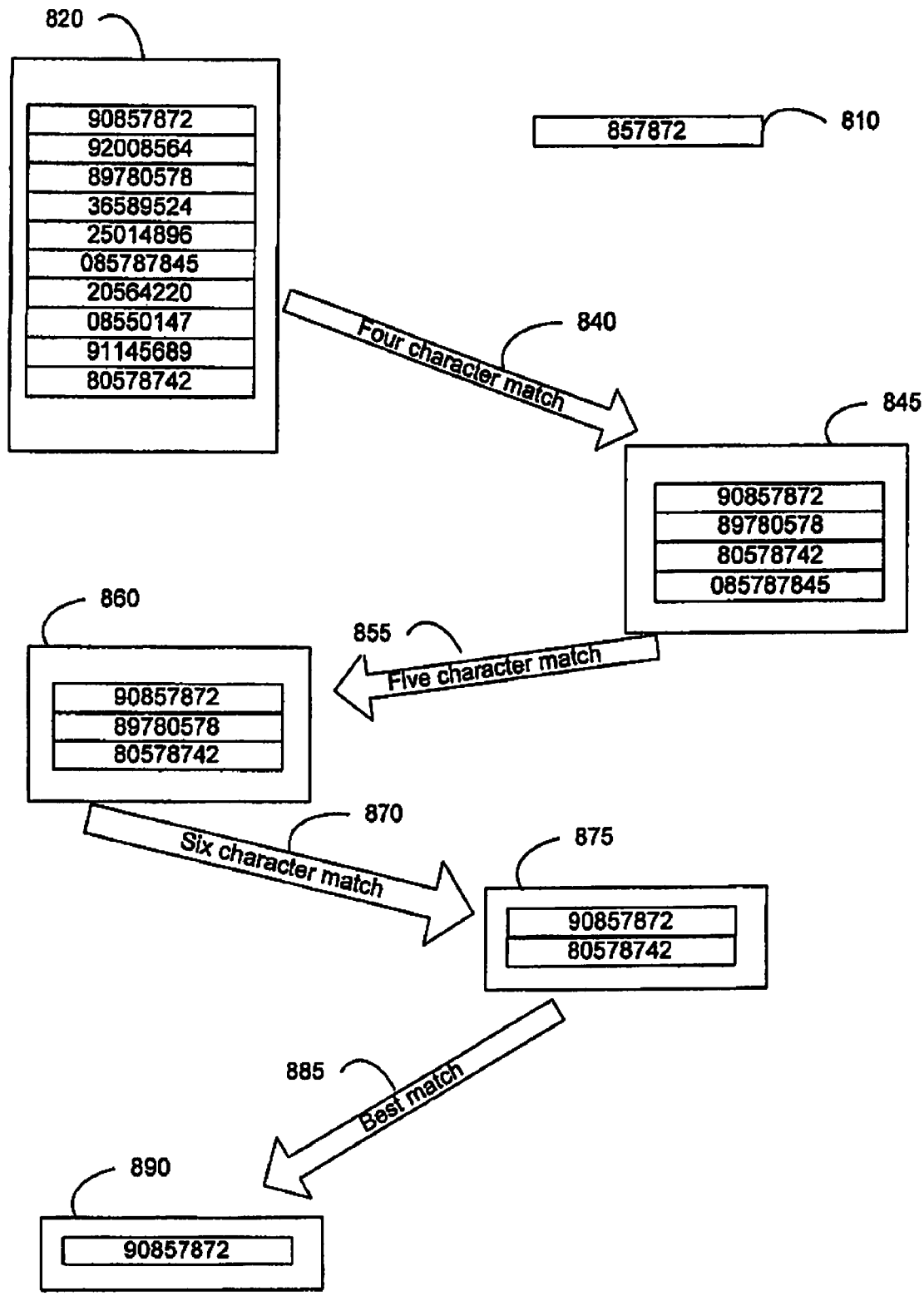
FIG. 7 is a block diagram depicting a view of subsets created by comparing identifier patterns according to one embodiment of the invention.

If a match exists, which may be that a single alphanumeric value that corresponds to the scanned media identifier matches a single alphanumeric value in a set of known media identifiers, a media management component determines the number of media items in the known set which match the scanned media identifier, step 725. Matching may be performed to narrow a set of results. For example, as shown in FIG. 7, a media item 810 may be scanned which includes the identifier "857872". The identifier may be matched to all media identifiers in a known set, such as set 820. A four character match set 840 may be obtained, in which all media items in the known set 820 having four characters that match the scanned media identifier 810 are provided in a subset 845. As shown, the character match may be according to the scanned pattern, or four matching characters in any order, or other matching technique. The media items may be further compared, to obtain a five character match 855 subset 860, a six character match 870 subset 875, or further character match, according to a user defined or automatic pre-set matching.

Referring again to FIG. 6, the media management component determines whether the number of matching media items satisfies a threshold, step 730. A threshold for a number of matching media items may be user defined, or automatically preset. For example, a threshold may be defined whereby a subset of matched media identifiers cannot exceed twenty items. Thus, if a match of a scanned media identifier and a set of known media identifiers yields a subset of twenty two media identifiers, the media item is assumed to be new and added to an index.

If, however, the subset of matched media identifiers is fewer than twenty, a closest matching media identifier may be identified, step 735. As shown in FIG. 7, a best match set of one media identifier 890 may be obtained by selecting a media identifier having a number of matching characters which appear in the same consecutive order as the scanned media identifier characters. Other matching patterns may be used to identify a best match, such as the media item having the greatest number of matching characters, a closest character order match, or other pattern matching which may include recognizing characters likely to be misread, such as a "3" misread as an "8", a "7" misread as a "1", or other matching. Other criteria may also be used to select a best match, based on the media identifier characters, or data relating to the media itself, such as a media type, or other criteria. Referring again to FIG. 6, an index, such as a media management component index or storage manager index may be updated with the best match media identifier and scanned media item data, step 740. In addition, a user may be notified of the matching media item.

Figure 8:
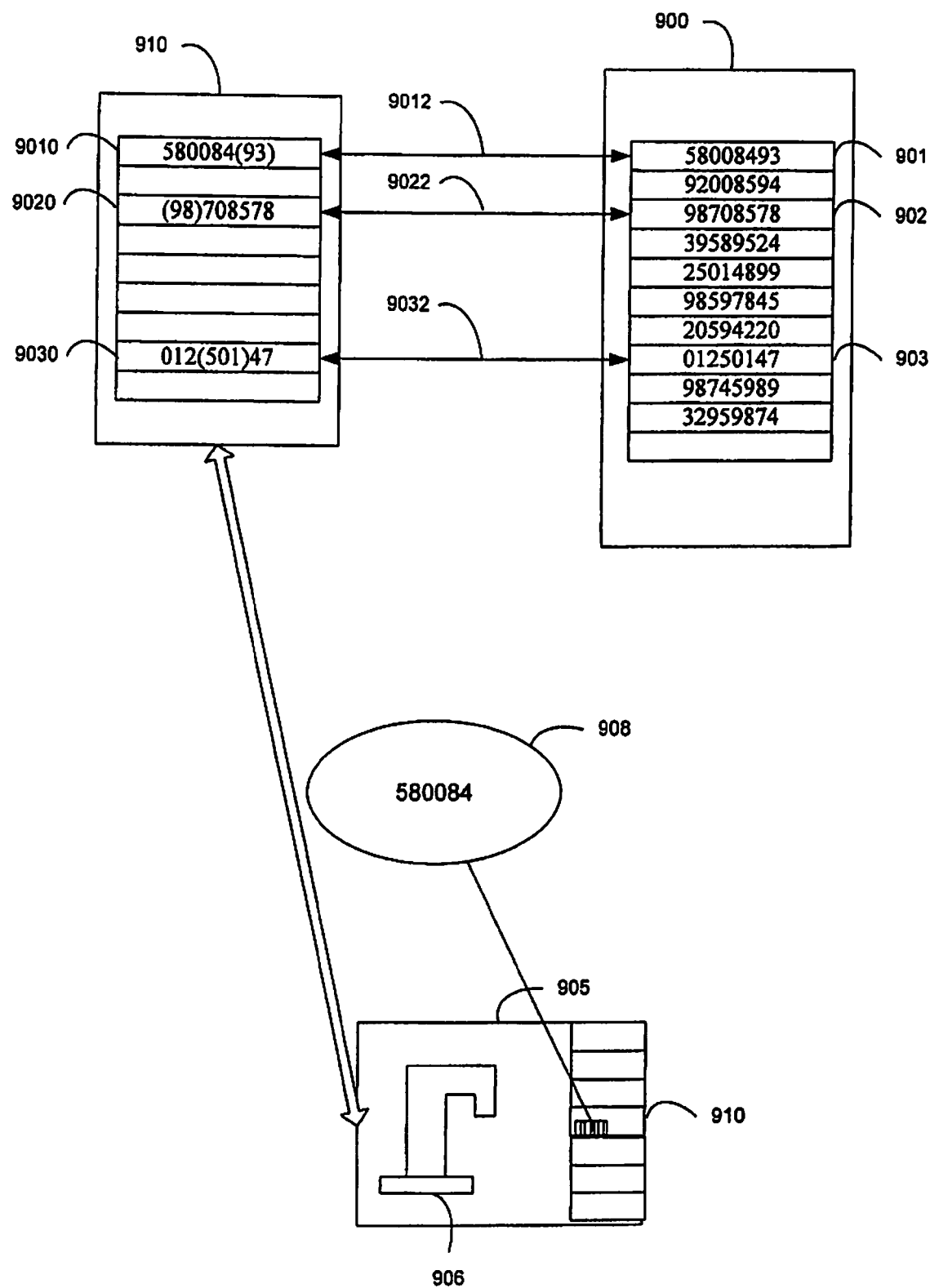
FIG. 8 is a block diagram depicting a view of an association between a media identifier as scanned and complete media identifier information according to one embodiment of the invention.

Referring to FIG. 8, an incomplete media identifier in a set of scanned media identifiers 910 may be associated with a respective set of complete or accurate media identifiers 900. The set of media identifiers 900 may, for example, comprise index data including entries for certain media items known to the system, storage manager or other system component, including media identifiers 901, 902 and 903. The incorrectly scanned media identifiers 9010, 9020, 9030 which are scanned with a defect in reading portions of a tail end, front end and middle, respectively, of the identifiers, may be associated with its respective accurate identifier via a link, pointer, or other association means, 9012, 9022, 9032. For example, an item 9010 having a scanned identifier "580084" may provide a front portion of an identifier, but which may be linked 9012 to an accurate item 901 which has a full or accurate identifier "58008493". In another example, item 9020 may have been scanned incorrectly and the beginning of the identifier may have been omitted so that "708578" is scanned. A link 9022 may be provided to the accurate identifier 902, "98708578". In yet another example, item 9030 may be scanned and a middle portion of the identifier is omitted, which may occur, for example, if there is a smudge or tear on the identifier surface and the scanned identifier is "012(---) 47". A link 9032 may be provided to the accurate identifier 903, "01250147".

Each media item 910 contained in a storage device 905 may be scanned by a scanner on a robotic arm 906 and a scanned media identifier 908 may be communicated from the storage device 905 to a media management component, which may store the media identifier set of data 910 in its index, or alternatively in a storage manager index. Although FIG. 8 depicts two tables in a relational database, it is understood that other indexes, tables or other methods may be used to track relationships between identifier data.

While the invention has been described and illustrated in connection with preferred embodiments, many variations and modifications as will be evident to those skilled in the art may be made without departing from the spirit and scope of the invention, and the invention is thus not to be limited to the precise details of methodology or construction set forth above as such variations and modifications are intended to be included within the scope of the invention.

I claim:

1. A non-transitory computer-readable medium storing instructions, that when executed by a computer perform a method for maintaining an index of removable storage media items, the method comprising:
    receiving data representing a portion of an identifier for a removable storage media;
    receiving data indicating a location of the removable storage media;
    matching the portion of the identifier with a set of known media identifiers to generate a subset of media identifiers;
    determining at least one closest match of the subset of media identifiers and portion of the identifier; and
    updating an index entry for the at least one closest match of the subset of media identifiers with the location of the removable storage media.

2. The method of claim 1 further comprising:
    according to a storage policy, verifying the location of the removable storage media, wherein verifying the location of the removable storage media comprises:
        scanning a media identifier on the removable storage media in a storage device;
        obtaining a current location of the removable storage media; and
        updating the index entry with the current location of the removable storage media.

3. A non-transitory computer readable medium including computer executable code, which when executed causes a computer to perform a method for maintaining an index of removable storage media items, the method comprising:
    receiving data indicating an identifier for a removable storage media, wherein the received data includes only a portion of the identifier for the removable storage media that is readable, but where a remaining portion of the identifier is unreadable;
    receiving data indicating a location of the removable storage media;
    comparing the received portion of the identifier with a set of known media identifiers to identify a closest match between the subset of media identifiers and the received portion of the identifier; and
    updating an index entry for the closest match of the subset of media identifiers with the location of the removable storage media.

4. The non-transitory computer readable medium of claim 3 further comprising:
    according to a storage policy, verifying the location of the removable storage media, wherein verifying the location of the removable storage media comprises:
        scanning a media identifier on the removable storage media in a storage device;
        obtaining a current location of the removable storage media; and
        updating the index entry with the current location of the removable storage media.

5. A non-transitory computer readable medium including computer executable code, which when executed causes a computer to perform a method for automatically identifying identifiers associated with multiple units of removable data storage media in an automated data storage library, wherein the automated data storage library can not read at least one identifier for at least one of the units of removable data storage media because of a portion of a type or length of the identifier, because a portion of the identifier is not scanned, or because a portion of the identifier is damaged, misaligned or is otherwise unreadable, the method comprising:
    determining that received data for an identifier of a unit of removable data storage media is new or is not recognized;
    matching the received data to a set of known media identifiers, wherein the matching includes at least one of pattern matching, order matching, length matching, character type matching, or sum matching;
    identifying a subset of known media identifiers among the set of known media identifiers that match the received identifier; and,
    identifying at least one closest match among the subset of known media identifiers to the received identifier.

6. The computer readable medium of claim 5 wherein the pattern matching includes matching at least a ratio of 6 of 8 characters,
    wherein the order matching includes matching at least a ratio of 4 of 6 characters in a same consecutive order,
    wherein the length matching includes matching a length of the identifier to a length of stored media identifier data,
    wherein the character type matching includes determining whether certain positions of the identifier correspond to alphanumeric characters appearing in the same positions in stored media identifier data, and
    wherein a sum of the characters of the identifier equals a sum of characters comprising a stored media identifier.

7. The computer readable medium of claim 5 further comprising receiving data indicating a location of the removable storage media; and
    updating an index entry with the closest match among the subset of known media identifiers with the data indicating the location of the removable storage media, wherein the index includes at least three of:
        a slot location in the automated data storage library;
        a media type for the at least one of the units of removable data storage media;
        information relating to data on the at least one of the units of removable data storage media;
        media capacity of the at least one of the units of removable data storage media; and,
        an age of the at least one of the units of removable data storage media.

8. The computer readable medium of claim 5 wherein the received identifier comprises a bar code or radio frequency identification tag.

9. The computer readable medium of claim 5 further comprising: determining that the number of media identifiers included in the subset satisfies a threshold, and wherein the threshold is user defined or is pre-set.

10. A method for automatically identifying identifiers associated with multiple units of removable data storage media in an automated data storage device, wherein the automated data storage device can not interpret at least one identifier for at least one of the units of removable data storage media because of a portion of a type or length of the identifier, because a portion of the identifier is not scanned, or because a portion of the identifier is damaged, misaligned or is otherwise unreadable, the method comprising:
- determining that received data for an identifier of a unit of removable data storage media is new or is not recognized;
- comparing the received data to a set of known media identifiers, wherein the comparing includes at least one of pattern matching, order matching, length matching, character type matching, or sum matching;
- identifying a subset of known media identifiers among the set of known media identifiers that match the received identifier; and,
- identifying at least one closest match among the subset of known media identifiers to the received identifier.

11. The method of claim 10 wherein the pattern matching includes matching at least a ratio of 6 of 8 characters,
- wherein the order matching includes matching at least a ratio of 4 of 6 characters in a same consecutive order,
- wherein the length matching includes matching a length of the identifier to a length of stored media identifier data,
- wherein the character type matching includes determining whether certain positions of the identifier correspond to alphanumeric characters appearing in the same positions in stored media identifier data, and,
- wherein a sum of the characters of the identifier equals a sum of characters comprising a stored media identifier.

12. The method of claim 10 further comprising:
- updating an index entry with the closest match among the subset of known media identifiers with data indicating a location of the removable storage media, wherein the index includes at least two of:
  - a slot location in the automated data storage device;
  - a media type for the at least one of the units of removable data storage media;
  - information relating to data on the at least one of the units of removable data storage media;
  - media capacity of the at least one of the units of removable data storage media; and,
  - an age of the at least one of the units of removable data storage media.

13. The method of claim 10 wherein the received identifier comprises a bar code or radio frequency identification tag.

14. The method of claim 10 further comprising: determining that the number of media identifiers included in the subset satisfies a threshold, and wherein the threshold is user defined or is pre-set.

15. A system for automatically identifying identifiers associated with multiple units of removable data storage media in an automated data storage device, wherein the automated data storage device can not read at least one identifier for at least one of the units of removable data storage media because of a portion of a type or length of the identifier, because a portion of the identifier is not scanned, or because a portion of the identifier is damaged, misaligned or is otherwise unreadable, the system comprising:
- a processor;
- means for determining that received data for an identifier of a unit of removable data storage media is new or is not recognized;
- means for matching the received data to a set of known media identifiers, wherein the matching includes at least one of pattern matching, order matching, length matching, character type matching, or sum matching;
- means for identifying a subset of known media identifiers among the set of known media identifiers that match the received identifier; and,
- means for identifying at least one closest match among the subset of known media identifiers to the received identifier.

16. The system of claim 15 wherein the pattern matching includes matching at least a ratio of 6 of 8 characters,
- wherein the order matching includes matching at least a ratio of 4 of 6 characters in a same consecutive order,
- wherein the length matching includes matching a length of the identifier to a length of stored media identifier data,
- wherein the character type matching includes determining whether certain positions of the identifier correspond to alphanumeric characters appearing in the same positions in stored media identifier data, and
- wherein a sum of the characters of the identifier equals a sum of characters comprising a stored media identifier.

17. The system of claim 15 further comprising:
- means for updating an index entry with the closest match among the subset of known media identifiers with data indicating a location of the removable storage media, wherein the index includes at least two of:
  - a slot location in the automated data storage device;
  - a media type for the at least one of the units of removable data storage media;
  - information relating to data on the at least one of the units of removable data storage media;
  - media capacity of the at least one of the units of removable data storage media; and,
  - an age of the at least one of the units of removable data storage media.

18. The system of claim 15 wherein the received identifier comprises a bar code or radio frequency identification tag.

19. The system of claim 15 further comprising: means for determining that the number of media identifiers included in the subset satisfies a threshold, and wherein the threshold is user defined or is pre-set.

* * * * *

UNITED STATES PATENT AND TRADEMARK OFFICE
CERTIFICATE OF CORRECTION

PATENT NO. : 7,987,319 B2  Page 1 of 1
APPLICATION NO. : 12/795870
DATED : July 26, 2011
INVENTOR(S) : Rajiv Kottomtharayil It is certified that error appears in the above-identified patent and that said Letters Patent is hereby corrected as shown below:

In column 9, line 40, in Claim 2, delete "method" and insert -- computer-readable medium --, therefor.

Signed and Sealed this
Eighteenth Day of October, 2011

David J. Kappos
*Director of the United States Patent and Trademark Office*